May 7, 1940. S. V. MANINGER 2,199,642
SICKLE DEVICE
Filed April 12, 1937 2 Sheets-Sheet 1
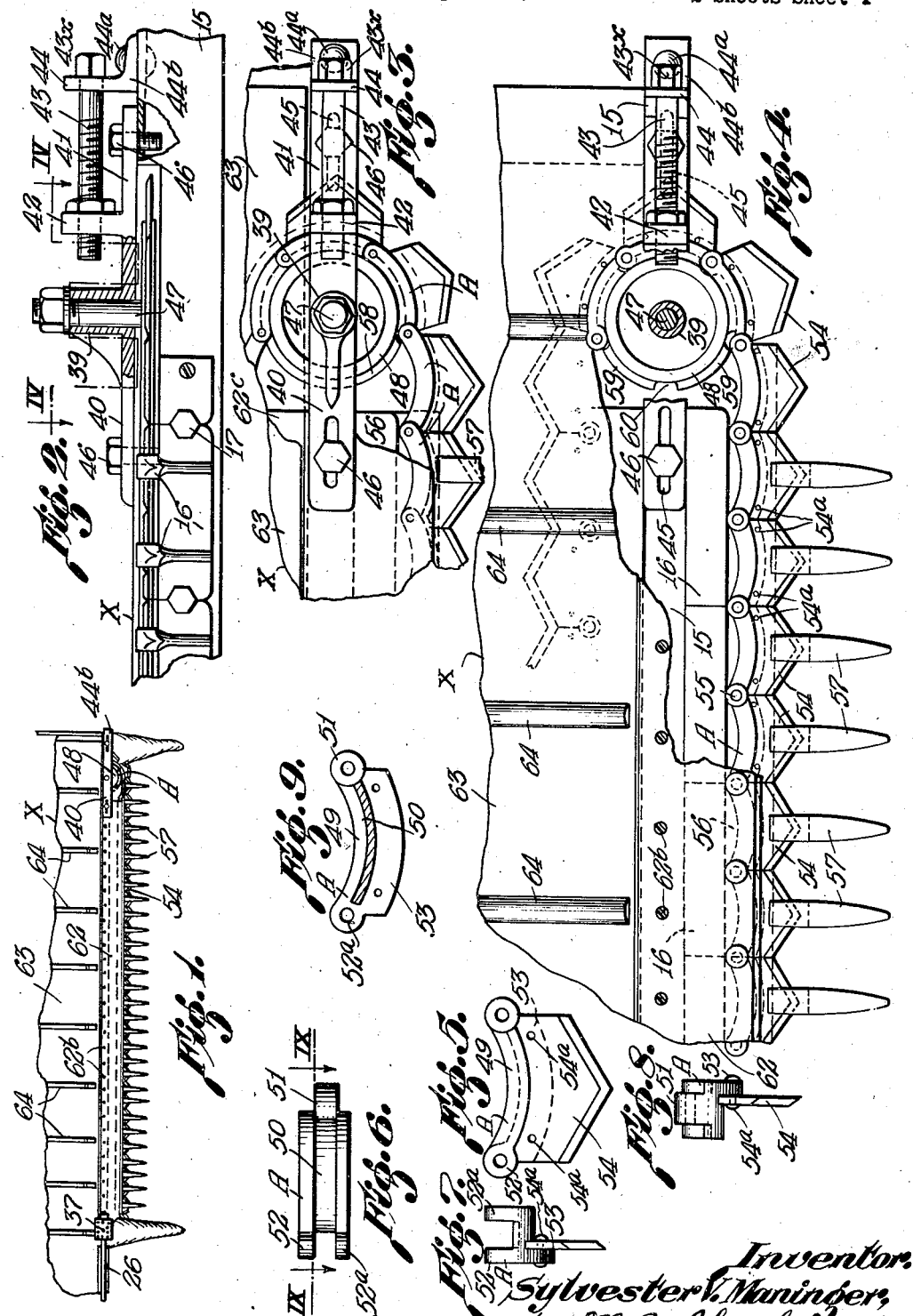
Inventor.
Sylvester V. Maninger,
by M. Y. Charles
Attorney.

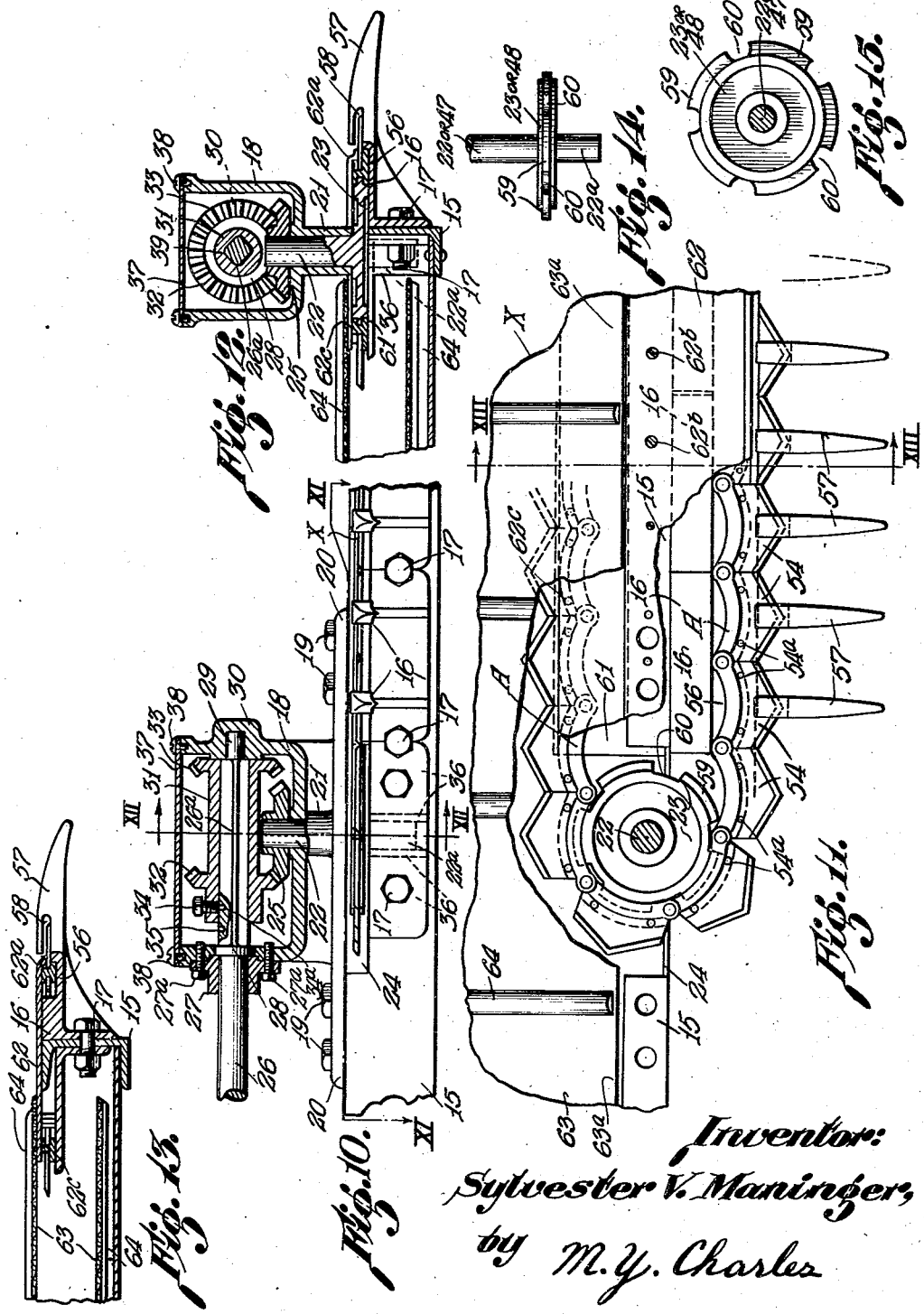

Patented May 7, 1940

2,199,642

UNITED STATES PATENT OFFICE 2,199,642

SICKLE DEVICE

Sylvester V. Maninger, Wichita, Kans., assignor of one-half to Richard Reida, Harper, Kans.

Application April 12, 1937, Serial No. 136,336

2 Claims. (Cl. 56—292)

My invention relates to improvements in sickle devices, header and harvester platforms and the like.

It has been the customary practice to make a sickle device in which the sickle sections are riveted to a sickle bar which is run in a vibratory or reciprocal motion. This worked very satisfactorily until recently when the manufacturers of such machinery attempted to speed up the machines and the result of which caused the sickle to vibrate so fast that it would either break the sickle bar or jerk the sickle head off the sickle, and so forth.

My improved sickle mechanism is designed to avoid the above mentioned trouble by providing a sickle mechanism in which the sickle blades are carried in a continuous motion similar to that of a chain running around a pair of sprocket wheels. These and other objects will be more fully explained as this description progresses.

Now referring to the accompanying drawings,

Fig. 1 is a plan view of the front portion of a harvester platform to which my invention has been applied.

Fig. 2 is an enlarged detail front view of the right hand end of the platform shown in Fig. 1, parts being shown in section for convenience of illustration.

Fig. 3 is a detail plan view of the parts shown in Fig. 2.

Fig. 4 is a plan view of the same parts as shown in Figs. 3 and 4 except the parts are broken away and parts are shown in section for convenience of illustration, the view being taken along the line IV—IV in Fig. 2.

Fig. 5 is a detail plan view of one of the sickle link sections.

Fig. 6 is a rear view of one of the sickle link sections shown in Fig. 5.

Fig. 7 is a view looking into the left hand end of the device shown in Fig. 5.

Fig. 8 is a view looking at the right hand end of the device shown in Fig. 5.

Fig. 9 is a sectional view taken along the line IX—IX in Fig. 6, the sickle blade being omitted.

Fig. 10 is an enlarged detail front view of the left hand end of the platform as shown in Fig. 1, the driving mechanism being shown in section for convenience of illustration.

Fig. 11 is a detailed plan and sectional view of the device shown in Fig. 10, part of which is shown in section for convenience of illustration, the view being taken along the line XI—XI in Fig. 10.

Fig. 12 is a detail sectional view taken along the line XII—XII in Fig. 10.

Fig. 13 is a detail sectional view taken along the line XIII—XIII in Fig. 11.

Fig. 14 is a side view of the spindle and sprocket wheel positioned at either end of the platform and around which the sickle chain travels.

Fig. 15 is a plan view of the spindle and sprocket wheel shown in Figures 2, 3, 4, 10, 11, 12 and 14.

Similar numerals of reference designate the same parts throughout the several figures of the drawings.

In the drawings is shown a harvester platform X having a front channel frame element 15 to which sickle guard elements 16 are bolted, by means of bolts 17. At 18 is a gear housing, which is rigidly attached to a frame element 15 by means of bolts 19, which pass through the foot 20 which is an integral part of the housing 18. In the housing 18 is integrally formed a bearing 21 in which is revolvably mounted a spindle 22, the lower end of which is provided with a sprocket wheel 23 which is positioned below the foot 20 and in a notch 24 that is cut into the channel element 15.

On the upper end of the spindle 22 and rigidly mounted thereon is a bevel gear element 25. At 26 is a drive shaft carried in a bearing 27 that is bolted to the housing 18 by means of bolts 27a. The drive shaft 26 is provided with an integrally formed collar 28 thereon, which rests against the inner end of the bearing 27 for reasons which will be later explained.

The inner end of the drive shaft 26 terminates in a spindle element 29 that is carried in a bearing element 30 that is integrally formed in the housing element 18.

The portion of the drive shaft 26 that is positioned intermediate the collar 28 and the spindle 29 is square as illustrated at 26a. Slidably mounted on the square shaft 26a is a sleeve element 31, having a pair of integrally formed opposing bevel gears 32 and 33 thereon. At 34 is a set screw that is threaded through the sleeve element 31, the lower end 34a of which projects into a hole 35 in the shaft 26a and rigidly positions the sleeve element 31 on the shaft 26a so that the bevel gear 32 engages the bevel gear 25 for driving purposes. The shaft 26a is provided with a second hole 35 so that the screw 34 may be unscrewed from the shaft 30 and the sleeve 31 slipped along the shaft 26a until the screw 34 may be entered into the hole 35 whereupon the gear 33 will engage the gear 25 for driving purposes. This arrangement provides a means of reverse drive for the gear 25 which in turn drives the sprocket wheel 23.

The lower end 22a of the spindle 22 projects below the sprocket wheel 23 and is carried in a bearing 36 that is rigidly bolted to the frame element 15 by means of bolts 17, as shown in Fig. 12.

The housing element 18 is provided with a cover plate 37 which is attached to the housing 18 by any suitable means such as bolts or screws 38.

On the opposite end of the frame element 15 is a bearing element 39 having outwardly extending portions 40 and 41 integrally formed thereon. The element 41 being provided with an upwardly extending element 42 which is provided with a threaded hole in which is threaded a bolt 43, the outer end of the bolt 43 passing through a vertically positioned leg 44 of an L shaped element 44b that is rigidly attached to the frame element 15 by means of a rivet 44a, the head 43x of the bolt 43 resting against the leg 44 in such a manner that when the bolt 43 is turned, the bearing element 39—40—41 will be slipped along the frame element 15 as will be readily understood.

The foot elements 40 and 41 are provided with elongated holes 45 through which pass bolts 46 that are threaded into the channel element 15, in such a manner that when the bearing element 39—40—41 has been properly positioned by the bolt 43, the bolts 46 may be screwed tight to rigidly hold the bearing element 39—40—41 in its adjusted position on the frame element 15.

Revolvably mounted in the bearing 39 is a spindle element 47 on the lower end of which is integrally formed a sprocket wheel 48 which is a duplicate of the sprocket wheel 23.

Around the two sprocket wheels 23 and 48 is a chain like element composed of a series of links A, a detail of which is shown in Figs. 5, 6, 7, 8 and 9. The links are curved as illustrated at 49 and the back side of each link is provided with a recess 50, at one end of which is integrally formed a tongue eye element 51 and at the other end is formed a pair of eye elements 52 and 52a.

Each link A is provided with a lip element 53 to which is riveted a sickle blade 54 by means of rivets 54a. The links are fastened together by placing the tongue eye element 51 of one link between the eye elements 52 and 52a of the adjacent link and then passing a pin 55 through the holes in the elements 51, 52 and 52a so as to form a hinge connection between the links of the sickle chain. The lip element 53 and the back side of the elements 52a, 51 and 52 rest in a continuous groove 56, formed in the elements 16, so that the edges of the sickle blades 54 will shear against the sickle guards 57 and pass through the slots 58. The links A are curved as previously mentioned so that as they go around the sprocket wheels 23 and 48, they will fit the curve of the sprocket wheels and the tongue 59 on the sprocket wheel will sink into the groove 50 in the back of the link and the hinge joint at each end of each link will fit into the openings 60 in the sprocket wheel, so that when the sprocket wheel 23 is driven, the sickle chain will also be driven in a circuitous route around the two sprocket wheels 23 and 48.

On the back side of the frame element 15 is rigidly attached an angle element 61, that forms a shelf on which the sickle chain may slide behind the element 15.

At 62 is a spring steel element attached by means of screws 62b or other suitable attaching means to the upper face of the frame element 15, the back edge 62c of which rests on the chain links A and the front edge of which is bent downward as at 62a to rest with spring pressure on the sickle blades 54 as previously described. The object of shifting the bearing 39—40—41 as previously described is to loosen or tighten the chain as desired.

At 63 is shown the usual platform canvas 63, having the usual ribs 64 attached thereto and the edge 63a of the canvas 63 is supported by, and slides on the rear portion 62c of the element 62.

Such modifications may be employed as lie within the scope of the appended claims without departing from the spirit and intention of the invention. Now having fully described my invention what I claim as new and desire to secure by Letters Patent is:

1. In a rotary sickle device; the combination of a frame element having a sprocket wheel revolvably mounted at each end thereof and a link sickle element strung around and between said sprocket wheels; a series of grooved sickle guard elements mounted on said frame element and projecting forwardly therefrom, the bases of said grooved sickle guard elements abutting each other so that the groove in each guard element registers with the groove in the adjacent guard element so as to form a continuous groove in front of, and in parallelism with the said frame element, and in such a position that the link sickle element will enter into and rest on the bottom of said groove and snugly fit between the side walls of said groove and the sickle blades carried by the links will slide across the guard fingers for shearing cutting purposes; said links being so joined together that the sickle blades carried thereon will abut each other when the said links are in said groove so as to afford a stiffening effect for the sickle element in advance of said frame element; a shelf like element carried by said frame element and extending rearwardly therefrom, said shelf element occupying the space intermediate the said sprocket wheels and being so positioned that the links of said link sickle element will pass thereover and rest thereon and a spring plate element rigidly mounted on said frame element and extending the distance between the said sprocket wheels, said spring plate extending over the link portions of the link sickle element both in front of and behind the said frame element, said spring plate exerting pressure on the sickle blades passing across the said guard fingers so as to insure a rubbing shearing effect between the sickle blades and the fingers of the sickle guard, said sickle blades having sharpened edges on two sides thereof so that the sickle will cut regardless of the direction of travel of the sickle, and means for driving one of said sprocket wheels in either of two selected directions, and means for adjusting the space intermediate the said sprocket wheels.

2. In a rotary sickle device, the combination of a frame element having a sprocket wheel revolvably mounted at each end thereof, a series of sickle guard elements rigidly mounted on said frame element and projecting forwardly therefrom; said guard elements having a groove therein, and said groove being so positioned as to form a continuous groove in front of, and parallel with the said frame element, a sickle element, said sickle element being composed of a series of chain like links each of which have a sickle blade rigidly mounted thereon, said sickle blade spanning the distance between centers of the hinge connections on each end of the link, said links having a concave curve on one edge, and a convex curve on the opposite edge and the curved portion of the links being adapted to be received in the groove in said guards, the curvature of the link providing a three point contact of the link in the groove so as to create the minimum amount of friction of the series of links in the said groove.

SYLVESTER V. MANINGER.